UNITED STATES PATENT OFFICE.

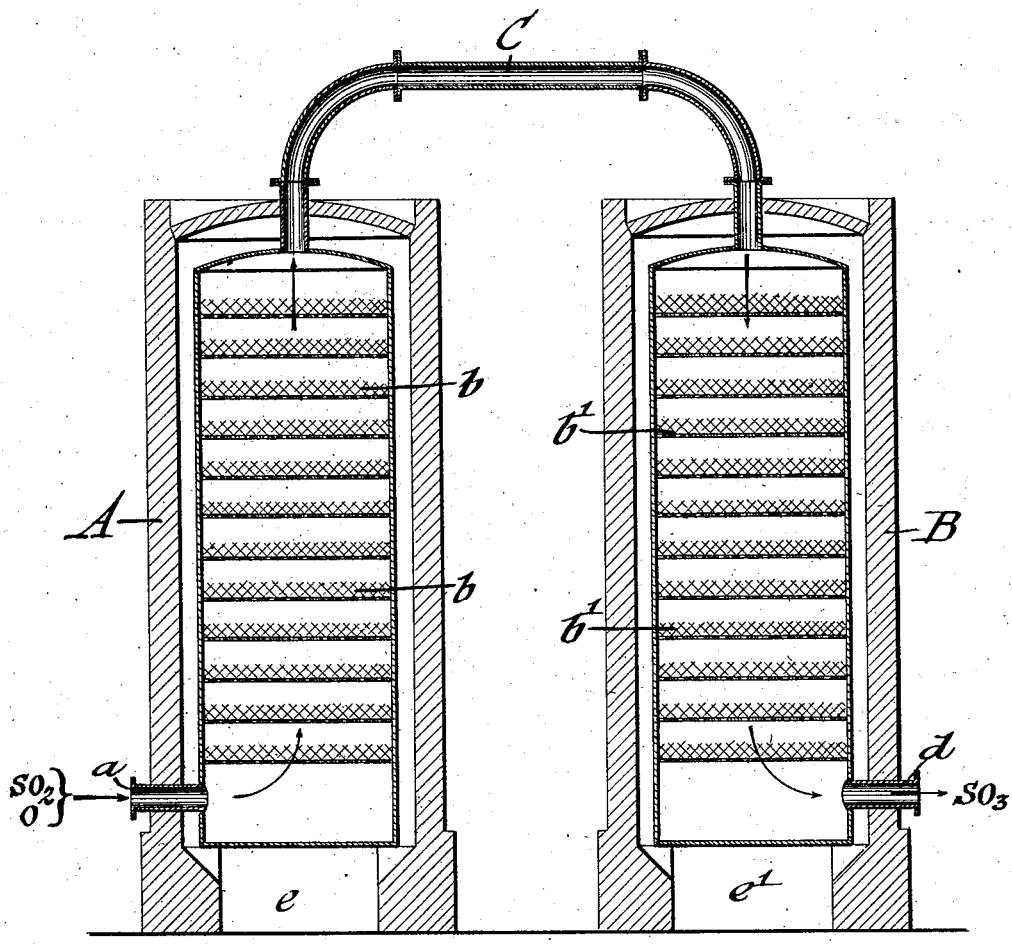

MAX LE BLANC, OF CARLSRUHE, AND CONSTANTIN KRAUSS, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF MAKING SULFURIC ANHYDRID.

SPECIFICATION forming part of Letters Patent No. 726,076, dated April 21, 1903.

Application filed June 19, 1901. Serial No. 65,159. (No specimens.)

*To all whom it may concern:*

Be it known that we, MAX LE BLANC, residing at Carlsruhe, and CONSTANTIN KRAUSS, residing at Höchst-on-the-Main, Germany, citizens of the Empire of Germany, have invented certain new and useful Improvements in Processes of Making Sulfuric Anhydrid, of which the following is a specification.

The speed of every chemical action whether endothermic or exothermic, as well as the final equilibrium, depend on the temperature of the sphere of action, or, in other words, under equal conditions a precise reaction velocity and equilibrium are inherent to every temperature. As regards the dependency on temperature, it is known from the teachings of thermo-dynamics confirmed by numerous experiments that the reaction velocity increases with a rise of temperature and that the equilibrium varies with rise of temperature in such a manner that those products increase which are formed with absorption of heat. These facts have been extensively applied knowingly and unknowingly in chemical industry, especially as regards organic chemistry. Instances are the acceleration of chemical reactions by heating and boiling and the moderation of them by cooling.

Manufacturers of inorganic chemicals have been paying greater attention of late to this field of physical chemistry. This is especially the case in the manufacture of sulfuric anhydrid by the contact process. Whereas formerly no particulars were given in patent specifications and the special literature as to the temperature inside the contact-chamber or there was used merely the ambiguous expression "dull red heat," the English Patent No. 3,166 of 1888 for the first time distinctly speaks of the temperature having to be carefully regulated in the contact-chamber. The inventor, however, omitted to give exact particulars as to temperature and merely says "at or below a dull red heat." This idea of regulating the temperature in the contact-chamber is again to be found in German Patent No. 118,932 and English Patent No. 285 of 1899, where it is technically applied in the production of sulfuric anhydrid.

The object to be attained is the greatest reaction velocity accompanied by the greatest yield of sulfuric anhydrid. A superficial observation, however, shows that a combination of these two factors in the manufacture of $SO_3$ is hardly possible with the present mode of working. Of course the reaction velocity may be increased at will by a rise of temperature; but then the equilibrium between $SO_2$, $O$, and $SO_3$ is also upset, as already said, in the sense that $SO_3$ decomposes into $SO_2$ and $O$. Experiments have undoubtedly confirmed this conclusion. It is well known that the combination $SO_2+O$ to form $SO_3$ is possible with a satisfactory technical yield only within certain limits of temperature, whereas at a temperature of about 400° centigrade the reaction is almost quantitative. The condition of equilibrium between $SO_2$, $O$, and $SO_3$ changes with the rise of temperature to the disadvantage of the formation of $SO_3$, and at about 500° centigrade a yield of only about eighty-five to ninety per cent., and at about 530° centigrade of about seventy-five to eighty per cent. of $SO_3$ is obtained from the $SO_2$ employed.

Further experiments have shown that the increase of the reaction velocity is surprisingly great. Thus in the presence of finely-divided platinum as "catalytic agent" at about 500° centigrade it is believed about twenty times as great as at 400° centigrade, and at higher temperature it increases still more. The same unit of platinum which is capable in the unit of time at 400° centigrade to transform almost quantitatively the $SO_2$ of a given limited quantity of pyrites-burner gases (*i. e.*, that even the smallest excess would not be transformed)—for instance, gases of about seven-volume per cent. of $SO_2$ and nine-volume per cent. of $O$—is also capable after our experiments in the same unit of time and at about 500° centigrade to transform about ninety per cent. of the $SO_2$ contained in twenty times the quantity of pyrites-burner gases of the same composition into $SO_3$—that is to say, a contact mass, for instance, which in a given time is capable of inducing the oxidation of one hundred parts of $SO_2$ to $SO_3$ converts in the same time, according to our experience, at about 500° centigrade about twenty times ninety, equaling eighteen hundred parts, of $SO_2$ to $SO_3$—that is, about eighteen times as much as at the lower temperature. At higher temperature the conditions are still more favorable. At a temperature of 500° centigrade the quantity of pyrites-burner gases brought up to the equipoise (ninety per cent. $SO_3$, ten per cent. $SO_2$) is twenty times greater than at a temperature of 400° centigrade, (one hundred per cent. $SO_3$, no per cent. $SO_2$.) The production of $SO_3$ is a resultant of velocity and temperature of the gases. At a temperature of 400° centigrade for one kilo of platinum-asbestos six liters per minute of pyrites-burner gases are brought up to the equipoise, whereas at a temperature of 500° centigrade one hundred and twenty liters per minute of the same gas mixture and the same quantity of catalytic are brought up to the equipoise, (ninety per cent. $SO_3$, ten per cent. $SO_2$.) From this fact, ascertained by experiment, it follows that really great reaction velocities first begin at temperatures at which the percentage in the yield of $SO_3$ decreases, although a specially good catalytic agent, such as finely-divided platinum, may have been employed, and that a combination of high reaction velocity and high yield is not attainable so long as the entire contact-chamber is kept at the same temperature, as has been the case hitherto.

The present invention relates to improvements in the manufacture of sulfuric anhydrid by the method in question, whereby the catalytic process in the contact-chamber is first allowed to take place at a high temperature and then at a low one. In the first zone of reaction the temperature is kept so high that a great part of $SO_2$ is oxidized into $SO_3$ in consequence of the great reaction velocity. The gases are then cooled to about 400° centigrade and allowed to pass the second contact zone at this lower temperature, where the rest of the $SO_2$ is oxidized, for considering the small quantities of $SO_2$ still remaining the reaction velocity suffices at this lower temperature.

The accompanying drawing illustrates an apparatus adapted for carrying on the new process.

In the drawing, A indicates the first contact-chamber, and B the second. C is a pipe connecting said chambers, said pipe being exposed, as shown, so as to permit the radiation of heat therefrom. The gases $SO_2+O$ enter A at $a$, pass upwardly through the successive layers $b$ of contact material, which has a temperature of approximately 500° centigrade, and are in part converted into $SO_3$. The mixture of $SO_3$ and unconverted $SO_2+O$ passes through pipe C to chamber B and downwardly through the layers $b'$ of contact material therein to the outlet $d$, from which the product issues. The contact-chambers may be maintained at any desired temperature by any suitable source of heat arranged in the spaces $e\ e'$ at the lower portion of the same.

As regards the technical application of this new process, two manners of obtaining the desired result may be described. Before the single contact used hitherto a second smaller contact may be inserted, in which case the reacting gases are first allowed to pass the smaller contact—for instance, at 530° centigrade. The reaction velocity here is so great that a considerable part of the $SO_2$ is rapidly oxidized to $SO_3$. About seventy-five per cent. of the $SO_2$ present is here converted into $SO_3$. Then the gases issuing from this contact-chamber and still containing about twenty-five per cent. are indirectly cooled to about 430° centigrade by a set of pipes or directly inside the apparatus by mixing the hot reacting gases with cold gases which have no influence on the reaction, and the gases thus cooled are allowed to pass through a second contact-chamber at this temperature, where nearly all the rest of the $SO_2$ is oxidized. The effect of course is the same, and the apparatus merely a complication if instead of two, three, or more contact-chambers with successively lower temperatures are inserted, so that the gases are caused to combine in the first contact at about 530° centigrade and in the last at about 430° centigrade. A second technically-convenient method is to enlarge the contact-chamber and to gradually cool the gases entering at about 530° to about 430° centigrade at their exit. In this case also one of the above-mentioned methods of cooling is used, and the effect is the same, but the apparatus more complicated, if two or more enlarged contacts are used.

The rate at which the gases in the foregoing example traverse the contact chambers or chamber is greater than that of the methods employed hitherto. This is due to the diminution of the contact itself—that is to say, the reaction being more rapid in consequence of the high temperature the gases need not stay so long in the contact-chamber, which, again, permits the employment of a considerably smaller contact surface or substance while obtaining the same quantity of $SO_3$. In our process the contact-chamber is much smaller and the gases pass the same far more rapidly than in the case of a larger contact-chamber. In the same time, therefore, and with the same quantity of contact mass the multiple quantity of gas converted is greater than was hitherto possible in a satisfactory manner.

For the purpose of this new process for manufacturing anhydrid and in view of the high temperature possible in the first zone of reaction the catalyzing substances available in the contact process were examined and the following results were obtained: 1. The metals of the platinum group. 2. The oxids and sulfates of Fe, Cr, Ni, Co, Mn, Mr, Cu. 3. The oxygen compounds of Al, Be, Zr, Ce, Di, La, Th, Ti, Si, and of nearly all rare metals. 4. Mixtures of No. 1 with one or more substances of Nos. 2 and 3. 5. Mixtures of two or more of the substances mentioned under Nos. 2 and 3.

It was found that whereas the catalyzing agents referred to under Nos. 1 and 4 prove to be efficacious already at a low temperature favorable to the formation of $SO_3$, the agents mentioned under Nos. 2, 3, and 5 are only efficacious at high temperatures favorable to the reaction velocity, but unfavorable to the yield of $SO_3$. Therefore in the above example, one of the catalyzing agents mentioned under 2 to 5 may be substituted for the expensive platinum in that part of the contact-chamber which is to be worked at high temperatures, whereas for the contact zone working at a low temperature the substances mentioned under 1 and 5 would only for the present be applicable.

The technical effect obtained by the process above described consists in being able to produce in the same contact-chamber with the same quantity of catalytic substances and in the same time a much greater quantity of $SO_3$ than has hitherto been obtained without any additional important cost and accompanied by an almost quantitative yield from the $SO_2$ gases treated.

Having thus described our invention, what we claim is—

The herein-described process of obtaining $SO_3$ from gases containing approximately seven per cent. of $SO_2$ and nine per cent. of O by means of the contact method, which consists in conducting the gas mixture through a first portion of contact substance at a temperature of approximately 500° centigrade and of approximately one hundred and twenty liters of pyrites-burner gases per kilo platinum-asbestos, and then directly conducting the resulting gas mixture at the same speed through a second portion of contact substance at a temperature of approximately 400° centigrade, substantially as set forth.

In testimony that we claim the foregoing as our invention we have signed our names in presence of two subscribing witnesses.

MAX LE BLANC.
CONSTANTIN KRAUSS.

Witnesses as to Max Le Blanc:
JACOB ADRIAN,
H. W. HARRIS.

Witnesses as to Constantin Krauss:
JEAN GRUND,
CARL GRUND.